US006693518B2

(12) United States Patent
Kumata et al.

(10) Patent No.: US 6,693,518 B2
(45) Date of Patent: Feb. 17, 2004

(54) SURROUND SURVEILLANCE SYSTEM FOR MOBILE BODY, AND MOBILE BODY, CAR, AND TRAIN USING THE SAME

(75) Inventors: Kiyoshi Kumata, Kyotanabe (JP); Toru Shigeta, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/846,298

(22) Filed: May 2, 2001

(65) Prior Publication Data

US 2002/0005896 A1 Jan. 17, 2002

(30) Foreign Application Priority Data

May 23, 2000 (JP) ...................................... 2000-152208

(51) Int. Cl.[7] ................................................. B60Q 1/00
(52) U.S. Cl. ....................... 340/435; 340/436; 340/937; 701/301; 348/148; 348/149
(58) Field of Search ................................ 340/435, 436, 340/901, 903, 937; 701/300, 301, 302; 348/148, 149

(56) References Cited

U.S. PATENT DOCUMENTS

| | | | | |
|---|---|---|---|---|
| 5,617,085 A | | 4/1997 | Tsutsumi et al. | 340/403 |
| 5,949,331 A | | 9/1999 | Schofield et al. | 340/461 |
| 5,959,555 A | * | 9/1999 | Furuta | 340/937 |
| 6,002,430 A | * | 12/1999 | McCall et al. | 348/207 |
| 6,333,759 B1 | * | 12/2001 | Mazzilli | 348/148 |
| 6,356,299 B1 | * | 3/2002 | Trosino et al. | 348/128 |
| 6,421,081 B1 | * | 7/2002 | Markus | 348/148 |
| 6,556,133 B2 | * | 4/2003 | Ogura | 340/435 |
| 6,567,121 B1 | * | 5/2003 | Kuno | 348/211.3 |

FOREIGN PATENT DOCUMENTS

| | | |
|---|---|---|
| JP | 06-295333 | 10/1994 |
| JP | A885385 | 4/1996 |
| JP | A10260324 | 9/1998 |
| JP | 2000-128031 | 5/2000 |

* cited by examiner

*Primary Examiner*—Daryl Pope
(74) *Attorney, Agent, or Firm*—Birch, Stewart, Kolasch & Birch, LLP

(57) ABSTRACT

A surround surveillance system mounted on a mobile body for surveying surroundings around the mobile body includes an omniazimuth visual system, the omniazimuth visual system including: at least one omniazimuth visual sensor including an optical system capable of obtaining an image of 360° view field area therearound and capable of central projection transformation for the image, and an imaging section for converting the image obtained by the optical system into first image data; an image processor for transforming the first image data into second image data for a panoramic image and/or for a perspective image; a display section for displaying the panoramic image and/or the perspective image based on the second image data; and a display control section for selecting and controlling the panoramic image and/or the perspective image.

15 Claims, 13 Drawing Sheets

$$\frac{X^2+Y^2}{a^2}-\frac{Z^2}{b^2}=-1$$

$$c^2=a^2+b^2$$

SURROUND SURVEILLANCE SYSTEM FOR MOBILE BODY, AND MOBILE BODY, CAR, AND TRAIN USING THE SAME

BACKGROUND OF THE INVENTION

1. Field of the Invention

The present invention relates to a surround surveillance system. In particular, the present invention relates to a surround surveillance system for a mobile body which is preferably used for surround surveillance of a car, a train, etc., for human and cargo transportation. Furthermore, the present invention relates to a mobile body (a car, a train, etc.) which uses the surround surveillance system.

2. Description of the Related Art

In recent years, an increase in traffic accidents has become a major social problem. In particular, in a crossroad or the like, various accidents may sometimes occur. For example, people rush out into the street in which cars are travelling, a car collides head-on or into the rear of another car, etc. It is believed, in general, that such accidents are caused because a field of view for drivers and pedestrians is limited in the crossroad area, and many of the drivers and pedestrians do not pay attention to their surroundings and cannot quickly recognize dangers. Thus, improvement in a car itself, arousal of attention of drivers, improvement and maintenance of traffic environment, etc., are highly demanded.

Conventionally, for the purpose of improving traffic environment, mirrors are installed at appropriate positions in a crossroad area such that the drivers and pedestrians can see blind areas behind obstacles. However, the amount of blind area which can be covered by a mirror is limited and, furthermore, a sufficient number of mirrors have not been installed.

In recent years, many large motor vehicles, such as buses and some passenger cars, have a surveillance system for checking the safety therearound, especially at a rear side of the vehicle. The system includes a surveillance camera installed in the rear of the vehicle, and a monitor provided near a driver's seat or on a dashboard. The monitor is connected to the surveillance camera via a cable. An image obtained by the surveillance camera is displayed on the monitor. However, even with such a surveillance system, the driver must check the safety at both sides of the vehicle mainly by his/her own eyes. Accordingly, in a crossroad area or the like, in which there are blind areas because of obstacles, the driver sometimes cannot quickly recognize dangers. Furthermore, a camera of this type has a limited field of view so that the camera can detect obstacles and anticipate the danger of collision only in one direction. In order to check the presence/absence of obstacles and anticipate the danger of collision over a wide range, a certain manipulation, e.g., alteration of a camera angle, is required.

Since a primary purpose of the conventional surround surveillance system for motor vehicles is surveillance in one direction, a plurality of cameras are required for watching a 360° area around a motor vehicle; i.e., it is necessary to provide four or more cameras such that each of front, rear, left, and right sides of the vehicle is provided with at least one camera.

Also, the monitor of the surveillance system must be installed at a position such that the driver can easily see the screen of the monitor from the driver's seat at a frontal portion of the interior of the vehicle. Thus, positions at which the monitor can be installed are limited.

In recent years, vehicle location display systems (car navigation systems) for displaying the position of a vehicle by utilizing a global positioning system (GPS) or the like have been widespread, and the number of cars which has a display device has been increasing. Thus, if a vehicle has a surveillance camera system and a car navigation system, a monitor of the surveillance camera system and a display device of the car navigation system occupy a large area and, hence, narrow the space around the driver's seat because they are separately provided. In many cases, it is impossible to install both the monitor and the display device at a position such that the driver can easily see the screen of the monitor from the driver's seat. Furthermore, it is troublesome to manipulate two systems at one time.

As a matter of course, in the case of using a motor vehicle, a driver is required to secure the safety around the motor vehicle. For example, when the driver starts to drive, the driver has to check the safety at the right, left, and rear sides of the motor vehicle, as well as the front side. Naturally, when the motor vehicle turns right or left, or when the driver parks the motor vehicle in a carport or drives the vehicle out of the carport, the driver has to check the safety around the motor vehicle. However, due to the shape and structure of the vehicle, there are driver's blind areas, i.e., there are areas that the driver cannot see directly behind and/or around the vehicle, and it is difficult for the driver to check the safety in the driver's blind areas. As a result, such blind areas impose a considerable burden on the driver.

Furthermore, in the case of using a conventional surround surveillance system, it is necessary to provide a plurality of cameras for checking the safety in a 360° area around the vehicle. In such a case, the driver has to selectively switch the cameras from one to another, and/or turn the direction of the selected camera according to circumstances, in order to check the safety around the vehicle. Such a manipulation is a considerable burden for the driver.

SUMMARY OF THE INVENTION

According to one aspect of the present invention, a surround surveillance system mounted on a mobile body for surveying surroundings around the mobile body includes an omniazimuth visual system, the omniazimuth visual system including: at least one omniazimuth visual sensor including an optical system capable of obtaining an image of 360° view field area therearound and capable of central projection transformation for the image, and an imaging section for converting the image obtained by the optical system into first image data; an image processor for transforming the first image data into second image data for a panoramic image and/or for a perspective image; a display section for displaying the panoramic image and/or the perspective image based on the second image data; and a display control section for selecting and controlling the panoramic image and/or the perspective image.

In one embodiment of the present invention, the display section displays the panoramic image and the perspective image at one time, or the display section selectively displays one of the panoramic image and the perspective image.

In another embodiment of the present invention, the display section simultaneously displays at least frontal, left, and right view field perspective images within the 360° view field area based on the second image data.

In still another embodiment of the present invention, the display control section selects one of the frontal, left, and right view field perspective images displayed by the display section; the image processor vertically/horizontally moves or scales-up/scales-down the view field perspective image selected by the display control section according to an external operation; and the display section displays the moved or scaled-up/scaled-down image.

In still another embodiment of the present invention, the display section includes a location display section for displaying a mobile body location image; and the display control section switches the display section between an image showing surroundings of the mobile body and the mobile body location image.

In still another embodiment of the present invention, the mobile body is a motor vehicle.

In still another embodiment of the present invention, the at least one omniazimuth visual sensor is placed on a roof of the motor vehicle.

In still another embodiment of the present invention, the at least one omniazimuth visual sensor includes first and second omniazimuth visual sensors; the first omniazimuth visual sensor is placed on a front bumper of the motor vehicle; and the second omniazimuth visual sensor is placed on a rear bumper of the motor vehicle.

In still another embodiment of the present invention, the first omniazimuth visual sensor is placed on a left or right corner of the front bumper; and the second omniazimuth visual sensor is placed at a diagonal position on the rear bumper with respect to the first omniazimuth visual sensor.

In still another embodiment of the present invention, the mobile body is a train.

In still another embodiment of the present invention, the surround surveillance system further includes: means for determining a distance between the mobile body and an object around the mobile body, a relative velocity of the object with respect to the mobile body, and a moving direction of the object based on a signal of the image data from the at least one omniazimuth visual sensor and a velocity signal from the mobile body; and alarming means for producing alarming information when the object comes into a predetermined area around the mobile body.

According to another aspect of the present invention, a surround surveillance system includes: an omniazimuth visual sensor including an optical system capable of obtaining an image of 360° view field area therearound and capable of central projection transformation for the image, and an imaging section for converting the image obtained by the optical system into first image data; an image processor for transforming the first image data into second image data for a panoramic image and/or for a perspective image; a display section for displaying the panoramic image and/or the perspective image based on the second image data; and a display control section for selecting and controlling the panoramic image and/or the perspective image.

According to still another aspect of the present invention, a mobile body includes the surround surveillance system according to the second aspect of the present invention.

According to still another aspect of the present invention, a motor vehicle includes the surround surveillance system according to the second aspect of the present invention.

According to still another aspect of the present invention, a train includes the surround surveillance system according to the second aspect of the present invention.

In the present specification, the phrase "an optical system is capable of central projection transformation" means that an imaging device is capable of acquiring an image which corresponds to an image seen from one of a plurality of focal points of an optical system.

Hereinafter, functions of the present invention will be described.

A surround surveillance system according to the present invention uses, as a part of an omniazimuth visual sensor, an optical system which is capable of obtaining an image of 360° view field area around a mobile body and capable of central projection transformation for the image. An image obtained by such an optical system is converted into first image data by an imaging section, and the first image data is transformed into a panoramic or perspective image, thereby obtaining second image data. The second image data is displayed on the display section. Selection of image and the size of the selected image are controlled by the display selection section. With such a structure of the present invention, a driver can check the safety around the mobile body without switching a plurality of cameras or changing the direction of the camera as in the conventional vehicle surveillance apparatus, the primary purpose of which is surveillance in one direction.

For example, an omniazimuth visual sensor(s) is placed on a roof or on a front or rear bumper of an automobile, whereby driver's blind areas can be readily watched. Alternatively, the surround surveillance system according to the present invention can be applied not only to automobiles but also to trains.

The display section can display a panoramic image and a perspective image at one time, or selectively display one of the panoramic image and the perspective image. Alternatively, among frontal, rear, left, and right view field perspective images, the display section can display at least frontal, left, and right view field perspective images at one time. When necessary, the display section displays the rear view field perspective image. Furthermore, the display control section may select one image, and the selected image may be vertically/horizontally moved (pan/tilt movement) or scaled-up/scaled-down by an image processor according to an external key operation. In this way, an image to be displayed can be selected, and the display direction and the size of the selected image can be freely selected/controlled. Thus, the driver can easily check the safety around the mobile body.

The surround surveillance system further includes a location display section which displays the location of the mobile body (vehicle) on a map screen using a GPS or the like. The display control section enables the selective display of an image showing surroundings of the mobile body and a location display of the mobile body. With such an arrangement, the space around the driver's seat is not narrowed, and manipulation is not complicated; i.e., problems of the conventional system are avoided.

The surround surveillance system further includes means for determining a distance from an object around the mobile body, the relative velocity of the mobile body, a moving direction of the mobile body, etc., which are determined based on an image signal from the omniazimuth visual sensor and a velocity signal from the mobile body. The surround surveillance system further includes means for producing alarming information when the object comes into a predetermined distance area around the mobile body. With such an arrangement, a safety check can be readily performed.

Thus, the invention described herein makes possible the advantages of (1) providing a surround surveillance system for readily observing surroundings of a mobile body in order to reduce a driver's burden and improve the safety around the mobile body and (2) providing a mobile body (a vehicle, a train, etc.) including the surround surveillance system.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the drawings.

(Embodiment 1)

Figure 1A:
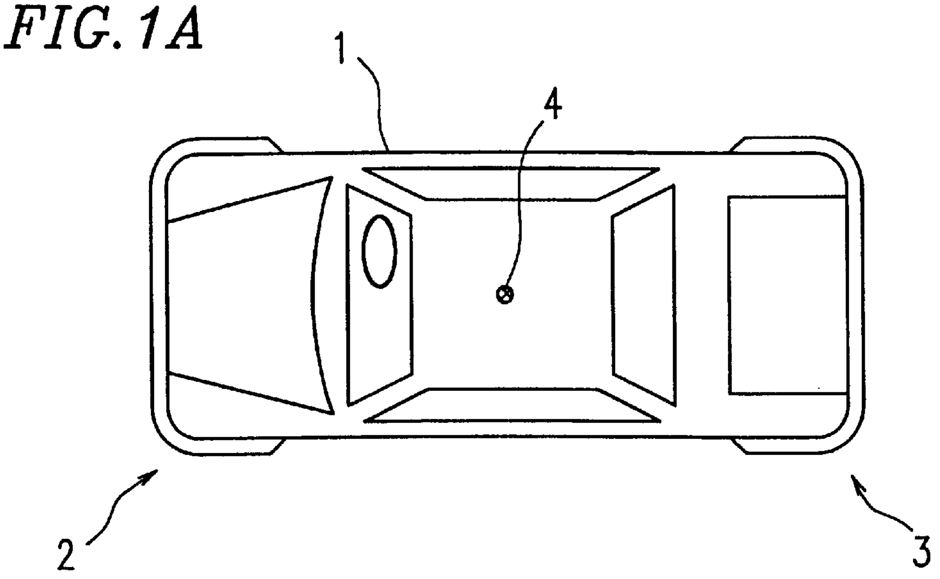
FIG. 1A is a plan view showing a vehicle including a surround surveillance system for a mobile body according to embodiment 1 of the present invention.
Figure 1B:
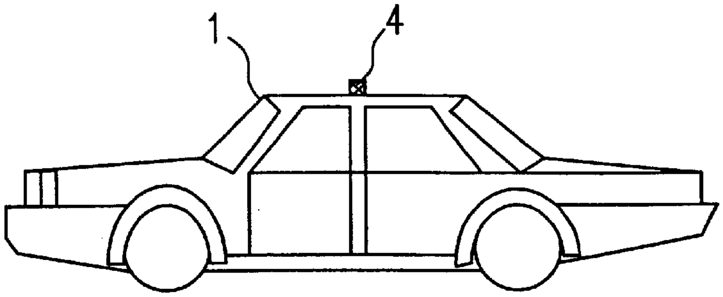
FIG. 1B is a side view of the vehicle.

FIG. 1A is a plan view showing a vehicle 1 which includes a surround surveillance system for a mobile body according to embodiment 1 of the present invention. FIG. 1B is a side view of the vehicle 1. The vehicle 1 has a front bumper 2, a rear bumper 3, and an omniazimuth visual sensor 4.

In embodiment 1, the omniazimuth visual sensor 4 is located on a roof of the vehicle 1, and capable of obtaining an image of 360° view field area around the vehicle 1 in a generally horizontal direction.

Figure 2:
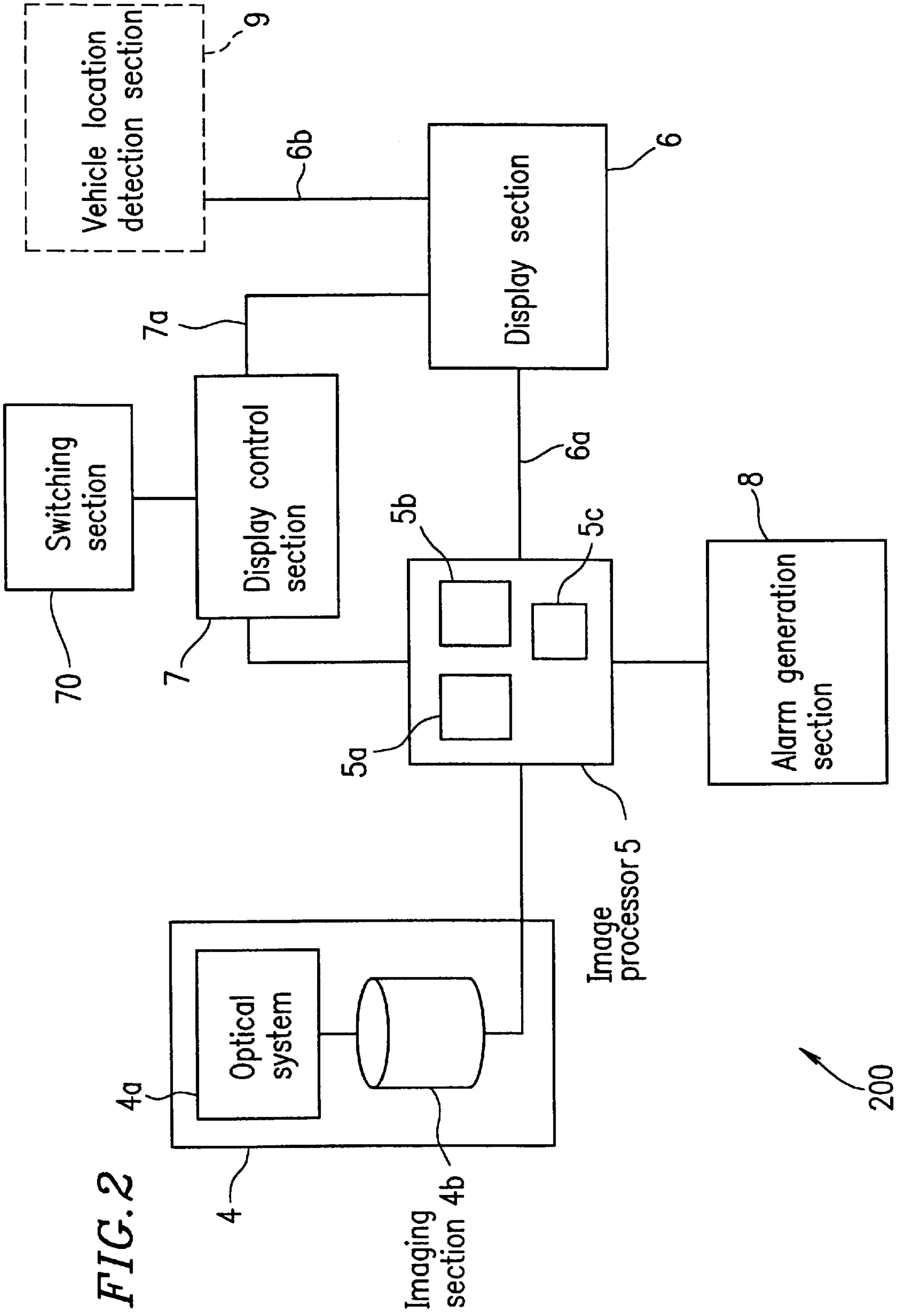
FIG. 2 is a block diagram showing a configuration of a surround surveillance system according to embodiment 1.

FIG. 2 is a block diagram showing a configuration of a surround surveillance system 200 for use in a mobile body (vehicle 1), which is an example of an omniazimuth visual system according to embodiment 1 of the present invention.

The surround surveillance system 200 includes the omniazimuth visual sensor 4, an image processor 5, a display section 6, a display control section 7, an alarm generation section 8, and a vehicle location detection section 9.

The omniazimuth visual sensor 4 includes an optical system 4*a* capable of obtaining an image of 360° view field area therearound and capable of central projection transformation for the image, and an imaging section 4*b* for converting the image obtained by the optical system 4*a* into image data.

The image processor 5 includes: an image transformation section 5*a* for transforming the image data obtained by the imaging section 4*b* into a panoramic image, a perspective image, etc.; an image comparison/distance determination section 5*b* for detecting an object around the omniazimuth visual sensor 4 by comparing image data obtained at different times with a predetermined time period therebetween, and for determining the distance from the object, the relative velocity with respect to the object, the moving direction of the object, etc., based on the displacement of the object between the different image data and a velocity signal from the omniazimuth visual sensor 4 which represents the speed of the vehicle 1; and an output buffer memory 5*c*.

The vehicle location detection section 9 detects a location of a vehicle in which it is installed (i.e., the location of the vehicle 1) in a map displayed on the display section 6 using the GPS or the like. The display section 6 can selectively display an output 6*a* of the image processor 5 and an output 6*b* of the vehicle location detection section 9.

The display control section 7 controls the selection among images of surroundings of the vehicle and the size of the selected image. Furthermore, the display control section 7 outputs to the display section 6 a control signal 7*a* for controlling a switch between the image of the surrounding of the vehicle 1 (the omniazimuth visual sensor 4) and the vehicle location image.

The alarm generation section 8 generates alarm information when an object comes into a predetermined area around the vehicle 1.

The display section 6 is placed in a position such that the driver can easily see the screen of the display section 6 and easily manipulate the display section 6. Preferably, the display section 6 is placed at a position on a front dashboard near the driver's seat such that the display section 6 does not narrow a frontal field of view of the driver, and the driver in the driver's seat can readily access the display section 6. The other components (the display processor 5, the display control section 7, the alarm generation section 8, and the vehicle location detection section 9) are preferably placed in a zone in which temperature variation and vibration are small. For example, in the case where they are placed in a luggage compartment (trunk compartment) at the rear end of the vehicle, it is preferable that they be placed at a possible distant position from an engine.

Each of these components is now described in detail with reference to the drawings.

Figure 3:
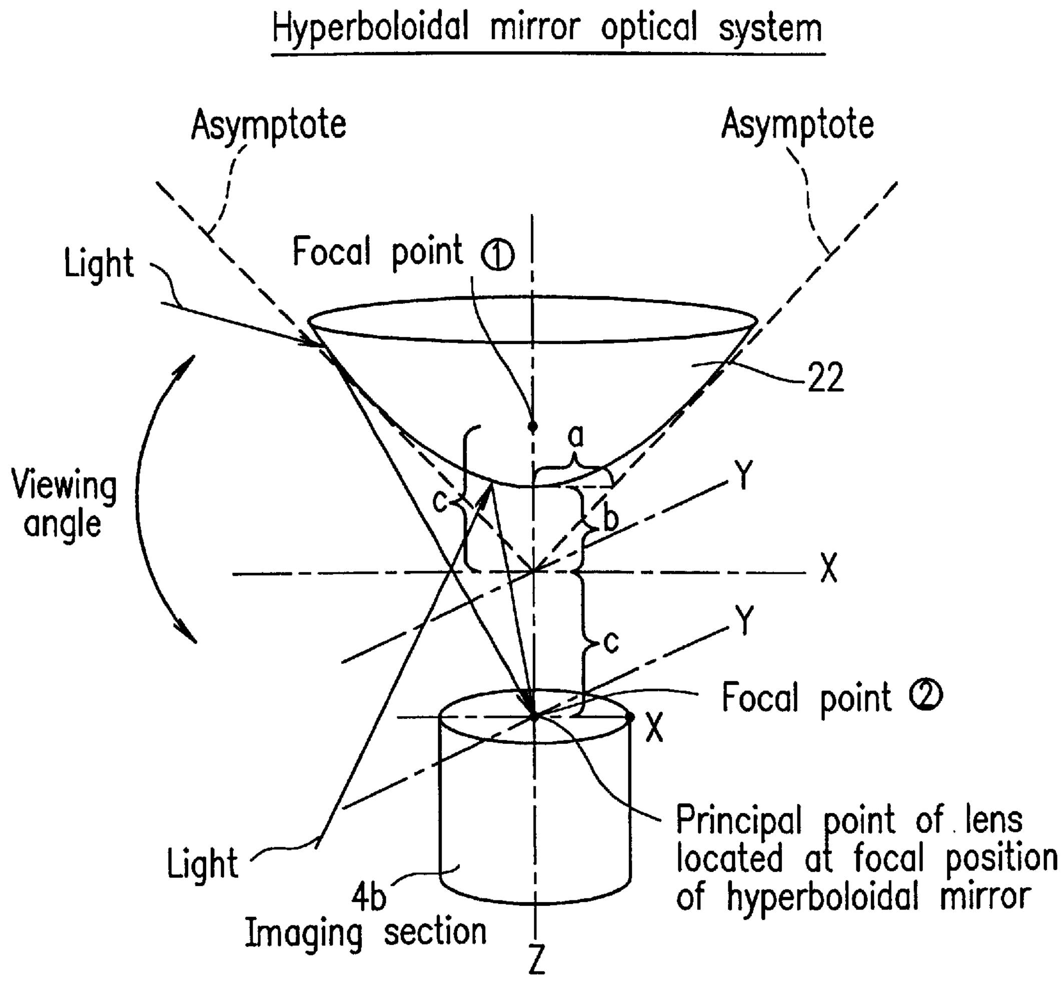
FIG. 3 shows a configuration example of an optical system according to embodiment 1.

FIG. 3 shows an example of the optical system 4*a* capable of central projection transformation. This optical system uses a hyperboloidal mirror 22 which has a shape of one sheet of a two-sheeted hyperboloid, which is an example of a mirror having a shape of a surface of revolution. The rotation axis of the hyperboloidal mirror 22 is identical with the optical axis of an imaging lens included in the imaging section 4*b*, and the first principal point of the imaging lens is located at one of focal points of the hyperboloidal mirror 22 (external focal point ②). In such a structure, an image obtained by the imaging section 4*b* corresponds to an image seen from the internal focal point ① of the hyperboloidal mirror 22. Such an optical system is disclosed in, for example, Japanese Laid-Open Publication No. 6-295333, and only several features of the optical system are herein described.

In FIG. 3, the hyperboloidal mirror 22 is formed by providing a mirror on a convex surface of a body defined by one of curved surfaces obtained by rotating hyperbolic curves around a z-axis (two-sheeted hyperboloid), i.e., a region of the two-sheeted hyperboloid where Z>0. This two-sheeted hyperboloid is represented as:

$$(X^2+Y^2)/a^2-Z^2/b^2=-1$$

$$c^2=(a^2+b^2)$$

where a and b are constants for defining a shape of the hyperboloid, and c is a constant for defining a focal point of the hyperboloid. Hereinafter, the constants a, b, and c are generically referred to as "mirror constants".

The hyperboloidal mirror 22 has two focal points ① and ②. All of light from outside which travels toward focal point ① is reflected by the hyperboloidal mirror 22 so as to reach focal point ②. The hyperboloidal mirror 22 and the imaging section **4*b* are positioned such that the rotation axis of the hyperboloidal mirror 22 is identical with the optical axis of an imaging lens of the imaging section 4*b*, and the first principal point of the imaging lens is located at focal point ②. With such a configuration, an image obtained by the imaging section 4*b* corresponds to an image seen from focal point ① of the hyperboloidal mirror 22**.

The imaging section **4*b* may be a video camera or the like. The imaging section 4*b* converts an optical image obtained through the hyperboloidal mirror 22 of FIG. 3 into image data using a solid-state imaging device, such as CCD, CMOS, etc. The converted image data is input to a first input buffer memory 11 of the image processor 5 (see FIG. 4). A lens of the imaging section 4*b*** may be a commonly-employed spherical lens or aspherical lens so long as the first principal point of the lens is located at focal point ②.

Figure 4:
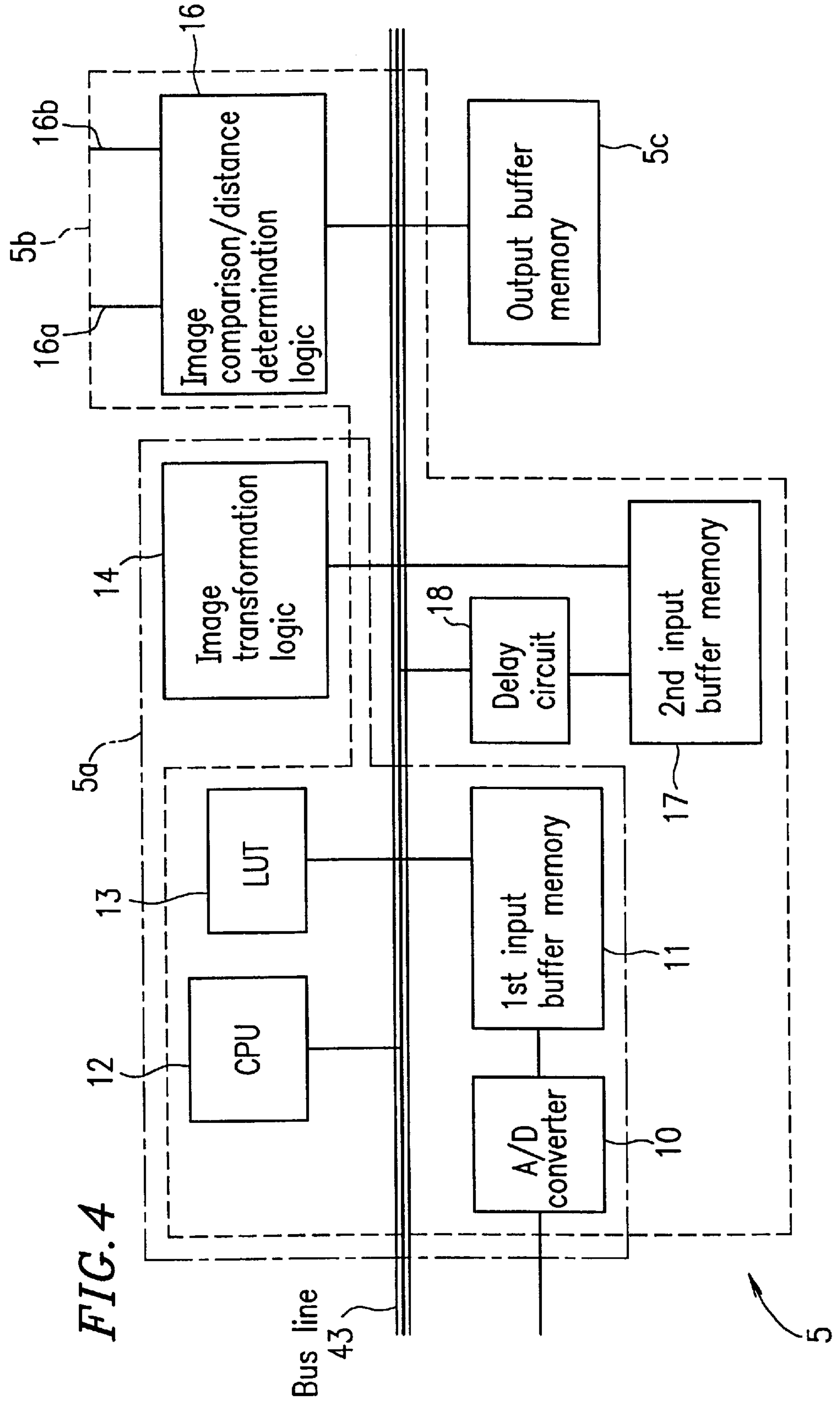
FIG. 4 is a block diagram showing a configuration example of the image processor 5.
Figure 5:
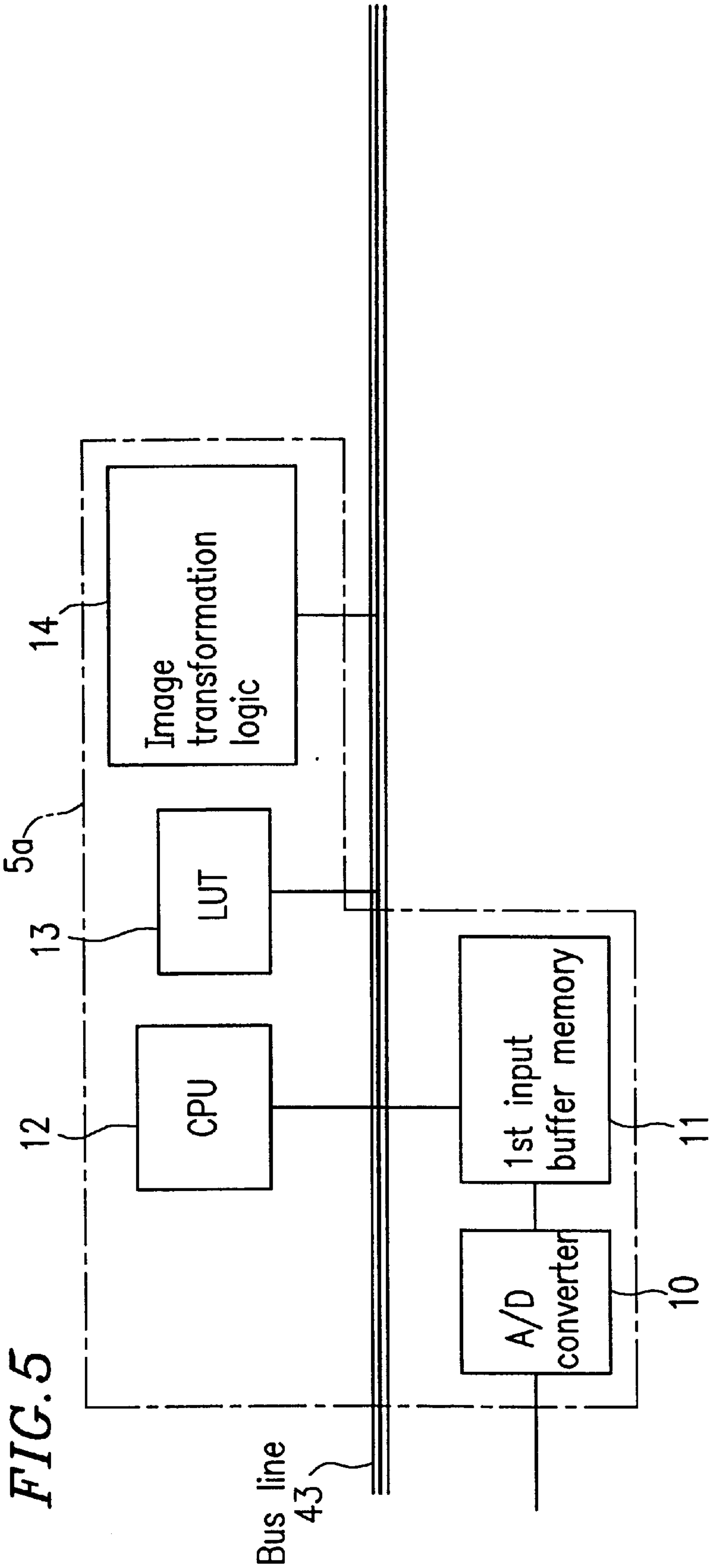
FIG. 5 is a block diagram showing a configuration example of an image transformation section 5*a* included in the image processor 5.
Figure 6:
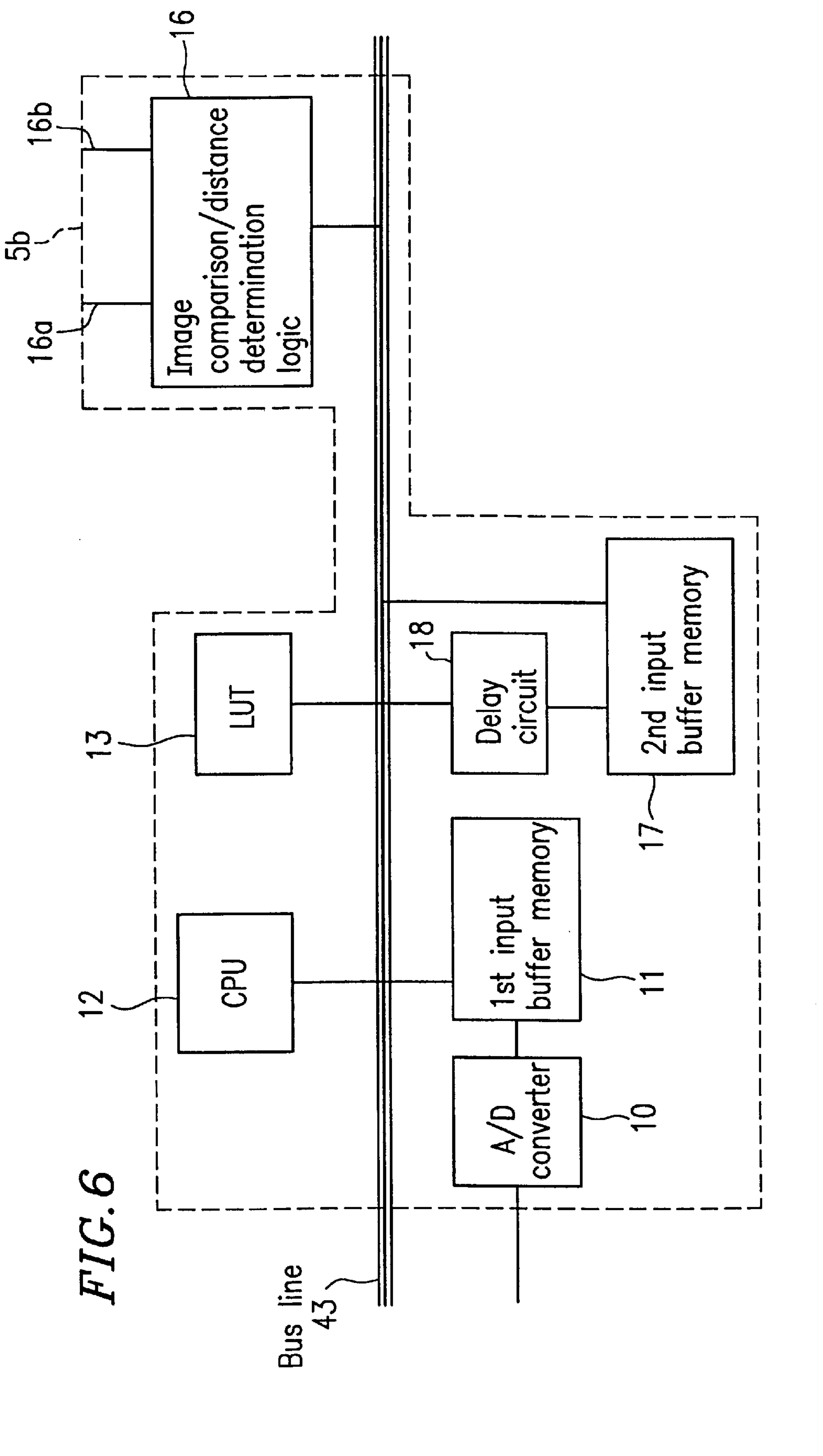
FIG. 6 is a block diagram showing a configuration example of an image comparison/distance determination section 5*b* included in the image processor 5.

FIG. 4 is a block diagram showing a configuration example of the image processor 5. FIG. 5 is a block diagram showing a configuration example of an image transformation section **5*a* included in the image processor 5. FIG. 6 is a block diagram showing a configuration example of an image comparison/distance determination section 5*b* included in the image processor 5**.

As shown in FIGS. 4 and 5, the image transformation section **5*a* of the image processor 5 includes an A/D converter 10, a first input buffer memory 11, a CPU 12, a lookup table (LUT) 13, and an image transformation logic 14**.

As shown in FIGS. 4 and 6, the image comparison/distance determination section **5*b* of the image processor 5 shares with the image transformation section 5*a* the A/D converter 10, the first input buffer memory 11, the CPU 12, the lookup table (LUT) 13, and further includes an image comparison/distance determination logic 16, a second input buffer memory 17, and a delay circuit 18**.

The output buffer memory **5*c* (FIG. 4) of the image processor 5 is connected to each of the above components via a bus line 43**.

The image processor 5 receives image data from the imaging section **4*b*. When the image data is an analog signal, the analog signal is converted by the A/D converter 10 into a digital signal, and the digital signal is transmitted to the first input buffer memory 11 and further transmitted from the first input buffer memory 11 through the delay circuit 18 to the second input buffer memory 17. When the image data is a digital signal, the image data is directly transmitted to the first input buffer memory 11 and transmitted through the delay circuit 18 to the second input buffer memory 17**.

In the image transformation section **5*a* of the image processor 5, the image transformation logic 14 processes an output (image data) of the first input buffer memory 11 using the lookup table (LUT) 13 so as to obtain a panoramic or perspective image, or so as to vertically/horizontally move or scale-up/scale-down an image. The image transformation logic 14 performs other image processing when necessary. After the image transformation processing, the processed image data is input to the output buffer memory 5*c*. During the processing, the components are controlled by the CPU 12. If the CPU 12** has a parallel processing function, faster processing speed is achieved.

A principle of the image transformation by the image transformation logic 14 is now described. The image transformation includes a panoramic transformation for obtaining a panoramic (360°) image and a perspective transformation for obtaining a perspective image. Furthermore, the perspective transformation includes a horizontally rotational transfer (horizontal transfer, so-called "pan movement") and a vertically rotational transfer (vertical transfer, so-called "tilt movement").

Figure 7:
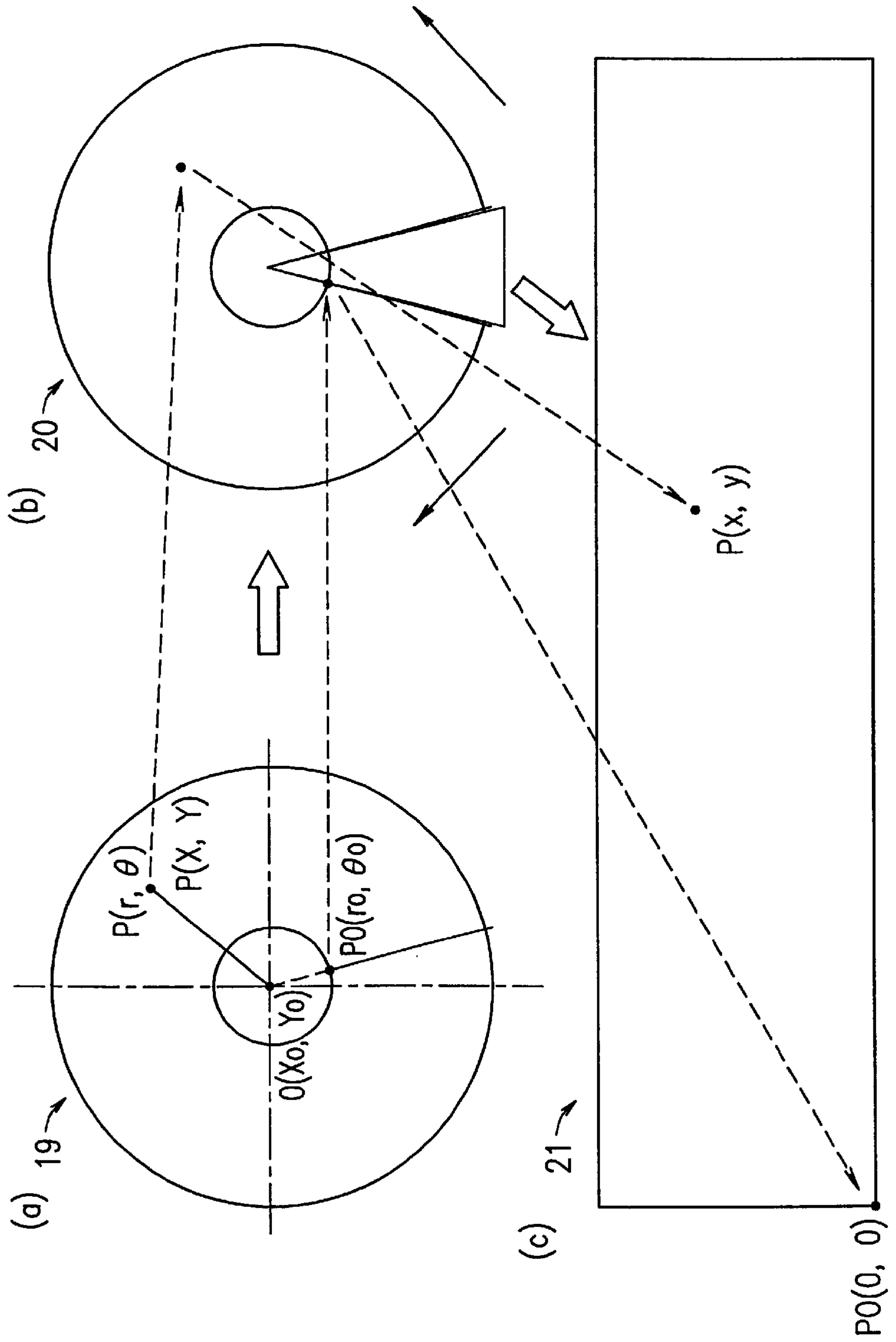
FIG. 7 illustrates an example of panoramic (360°) image transformation according to embodiment 1. Part (a) shows an input round-shape image. Part (b) shows a donut-shape image subjected to the panoramic image transformation. Part (c) shows a panoramic image obtained by transformation into a rectangular coordinate.

First, a panoramic (360°) image transformation is described with reference to FIG. 7. Referring to part (a) of FIG. 7, an image 19 is a round-shape image obtained by the imaging section **4*b*. Part (b) of FIG. 7 shows a donut-shape image 20 subjected to the panoramic image transformation. Part (c) of FIG. 7 shows a panoramic image 21 obtained by transforming the image 19** into a rectangular coordinate.

Part (a) of FIG. 7 shows the input round-shape image 19 which is formatted in a polar coordinate form in which the center point of the image 19 is positioned at the origin (Xo,Yo) of the coordinates. In this polar coordinate, a pixel P in the image 19 is represented as P(r,θ). Referring to part (c) of FIG. 7, in the panoramic image 21, a point corresponding to the pixel P in the image 19 (part (a) of FIG. 7) can be represented as P(x,y). When the round-shape image 19 shown in part (a) of FIG. 7 is transformed into the square panoramic image 21 shown in part (c) of FIG. 7 using a point PO(ro, θo) as a reference point, this transformation is represented by the following expressions:

$$x=\theta-\theta o$$

$$y=r-ro$$

When the input round-shape image 19 (part (a) of FIG. 7) is formatted into a rectangular coordinate such that the center point of the round-shape image 19 is positioned at the origin of the rectangular coordinate system, (Xo,Yo), the point P on the image 19 is represented as (X,Y). Accordingly, X and Y are represented as:

$$X=Xo+r\times\cos\theta$$

$$Y=Yo+r\times\sin\theta$$

Thus, $$X=Xo+(y+ro)\times\cos(x+\theta o)$$

$$Y=Yo+(y+ro)\times\sin(x+\theta o)$$

In the pan movement for a panoramic image, a point obtained by increasing or decreasing "θo" of the reference point PO(ro, θo) by a certain angle θ according to a predetermined key operation is used as a new reference point for the pan movement. With this new reference point for the pan movement, a horizontally panned panoramic image can be directly obtained from the input round-shape image 19. It should be noted that a tilt movement is not performed for a panoramic image.

Next, a perspective transformation is described with reference to FIG. 8. In the perspective transformation, the position of a point on the input image obtained by a light receiving section 4*c* of the imaging section 4*b* which corresponds to a point in a three-dimensional space is calculated, and image information at the point on the input image is allocated to a corresponding point on a perspective-transformed image, whereby coordinate transformation is performed.

Figure 8:
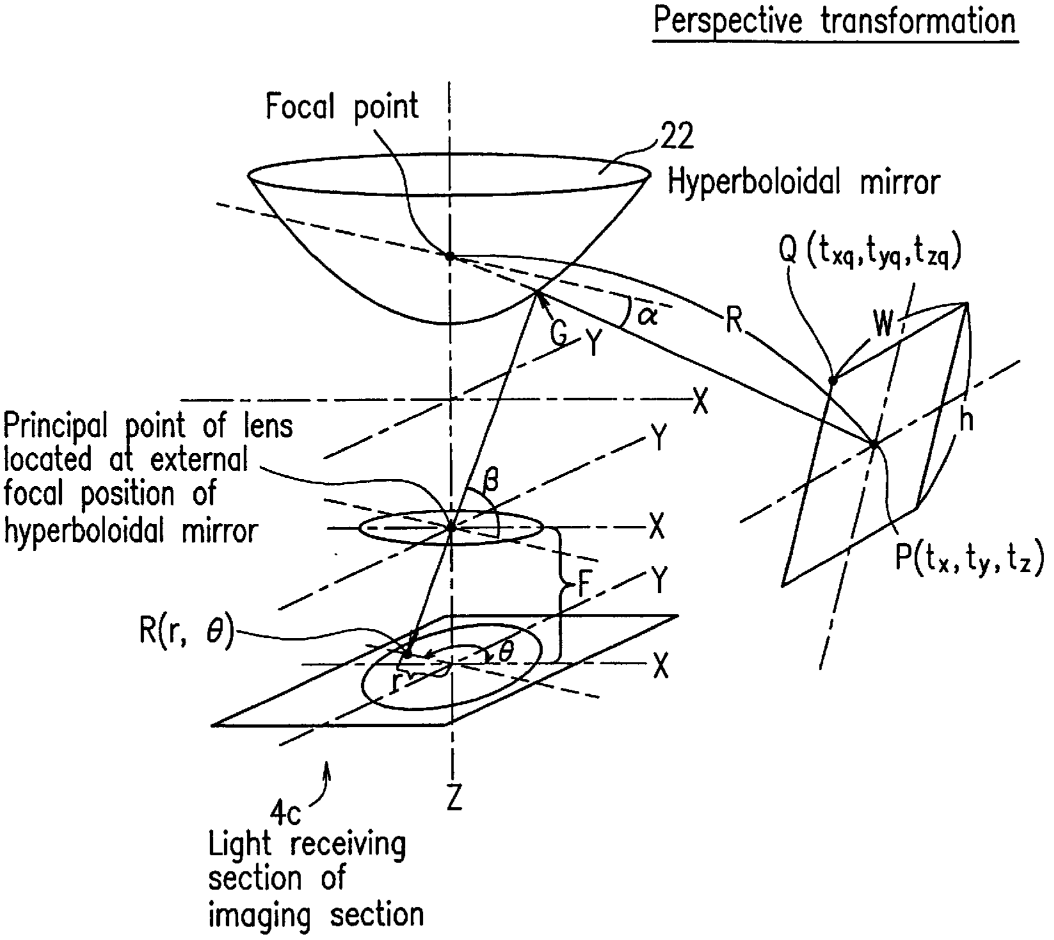
FIG. 8 illustrates a perspective transformation according to embodiment 1.

In particular, as shown in FIG. 8, a point in a three-dimensional space is represented as P (tx, ty, tz), a point corresponding thereto which is on a round-shape image formed on a light receiving plane of a light receiving section 4*c* of the imaging section 4*b* is represented as R(r,θ), the focal distance of the light receiving section 4*c* of the imaging section 4*b* (a distance between a principal point of a lens and a receiving element of the light receiving section 4*c*) is F, and mirror constants are (a, b, c), which are the same as a, b, and c in FIG. 3. With these parameters, expression (1) is obtained:

$$r=F\times\tan((\pi/2)-\beta)\ldots \quad (1)$$

In FIG. 8, α is an incident angle of light which travels from an object point (point P) toward focal point ① with respect to a horizontal plane including focal point ①; β is an incident angle of light which comes from point P, is reflected at point G on the hyperboloidal mirror 22, and enters into the imaging section 4*b* (angle between the incident light and a plane perpendicular to an optical axis of the light receiving section 4*c* of the imaging section 4*b*). Algebraic numbers α, β, and θ are represented as follows:

$$\beta=\arctan(((b^2+c^2)\times\sin\alpha-2\times b\times c)/(b^2-c^2)\times\cos\alpha)$$

$$\alpha=\arctan(tz/sqrt(tx^2+ty^2))$$

$$\theta=\arctan(ty/tx)$$

From the above, expression (1) is represented as follows:

$$r=F\times(((b^2-c^2)\times sqrt(tx^2+ty^2))/((b^2+c^2)\times tz-2\times b\times c\times sqrt(tx^2+ty^2+tz^2)))$$

The coordinate of a point on the round-shape image is transformed into a rectangular coordinate P (X,Y). X and Y are represented as:

$$X=r\times\cos\theta$$

$$Y=r\times\sin\theta$$

Accordingly, from the above expressions:

$$X=F\times(((b^2-c^2)\times tx/((b^2+c^2)\times tz-2\times b\times c\times sqrt(tx^2+ty^2+tz^2))) \quad (2)$$

$$Y=F\times(((b^2-c^2)\times ty/((b^2+c^2)\times tz-2\times b\times c\times sqrt(tx^2+ty^2+tz^2))) \quad (3)$$

With the above expressions, object point P (tx,ty,tz) is perspectively transformed onto the rectangular coordinate system.

Now, referring to FIG. 8, consider a square image plane having width W and height h and located in the three-dimensional space at a position corresponding to a rotation angle θ around the Z-axis where R is a distance between the plane and focal point ① of the hyperboloidal mirror 22, and φ is a depression angle (which is equal to the incident angle α). Parameters of a point at the upper left corner of the square image plane, point Q (txq,tyq,tzq), are represented as follows:

$$txq=(R\cos\phi+(h/2)\sin\phi)\cos\theta-(W/2)\sin\theta \quad \ldots(4)$$

$$tyq=(R\cos\phi+(h/2)\sin\phi)\sin\theta+(W/2)\cos\theta \quad \ldots(5)$$

$$tzq=R\sin\phi-(h/2)\cos\phi \quad \ldots(6)$$

By combining expressions (4), (5), and (6) into expressions (2) and (3), it is possible to obtain the coordinate (X,Y) of a point on the round-shape image formed on the light receiving section 4*c* of the imaging section 4*b* which corresponds to point Q of the square image plane. Furthermore, assume that the square image plane is transformed into a perspective image divided into pixels each having a width d and a height e. In expressions (4), (5), and (6), the parameter W is changed in a range from W to −W on the units of W/d, and the parameter h is changed in a range from h to −h on the units of h/e, whereby coordinates of points on the square image plane are obtained. According to these obtained coordinates of the points on the square image plane, image data at points on the round-shape image formed on the light receiving section 4*c* which correspond to the points on the square image plane is transferred onto a perspective image.

Next, a horizontally rotational movement (pan movement) and a vertically rotational movement (tilt movement) in the perspective transformation are described. First, a case where point P as mentioned above is horizontally and rotationally moved (pan movement) is described. A coordinate of a point obtained after the horizontally rotational movement, point P' (tx',ty',tz'), is represented as follows:

$$tx'=(R\cos\phi+(h/2)\sin\phi)\cos(\theta+\Delta\theta)-(W/2)\sin(\theta+\Delta\theta) \quad \ldots(7)$$

$$ty'=(R\cos\phi+(h/2)\sin\phi)\sin(\theta+\Delta\theta)+(W/2)\cos(\theta+\Delta\theta) \quad \ldots(8)$$

$$tz'=R\sin\phi-(h/2)\cos\phi \quad \ldots(9)$$

where Δθ denotes a horizontal movement angle.

By combining expressions (7), (8), and (9) into expressions (2) and (3), the coordinate (X,Y) of a point on the round-shape image formed on the light receiving section 4*c* which corresponds to the point P' (tx',ty',tz') can be obtained. This applies to other points on the round-shape image. In expressions (7), (8), and (9), the parameter W is changed in a range from W to −W on the units of W/d, and the parameter h is changed in a range from h to −h on the units of h/e, whereby coordinates of points on the square image plane are obtained. According to these obtained coordinates of the points on the square image plane, image data at points on the round-shape image formed on the light receiving section 4*c* which correspond to the point P' (tx',ty',tz') is transferred onto a perspective image, whereby a horizontally rotated image can be obtained.

Next, a case where point P as mentioned above is vertically and rotationally moved (tilt movement) is described. A coordinate of a point obtained after the vertically rotational movement, point P" (tx",ty",tz"), is represented as follows:

$$tx''=(R\cos(\phi+\Delta\phi)+(h/2)\sin(\phi+\Delta\phi)\times\cos\theta-(W/2)\sin\theta \quad \ldots(10)$$

$$ty''=(R\cos(\phi+\Delta\phi)+(h/2)\sin(\phi+\Delta\phi)\times\sin\theta+(W/2)\cos\theta \quad \ldots(11)$$

$$tz''=R\sin(\phi+\Delta\phi)-(h/2)\cos(\phi+\Delta\phi) \quad \ldots(12)$$

where Δφ denotes a vertical movement angle.

By combining expressions (10), (11), and (12) into expressions (2) and (3), the coordinate (X,Y) of a point on the round-shape image formed on the light receiving section 4*c* which corresponds to the point P" (tx",ty",tz") can be obtained. This applies to other points on the round-shape image. In expressions (10), (11), and (12), the parameter W is changed in a range from W to −W on the units of W/d, and the parameter h is changed in a range from h to −h on the units of h/e, whereby coordinates of points on the square image plane are obtained. According to these obtained coordinates of the points on the square image plane, image data at points on the round-shape image formed on the light receiving section 4*c* which correspond to the point P" (tx",ty",tz") is transferred onto a perspective image, whereby a vertically rotated image can be obtained.

Further, a zoom-in/zoom-out function for a perspective image is achieved by one parameter, the parameter R. In particular, the parameter R in expressions (4) through (12) is changed by a certain amount ΔR according to a certain key operation, whereby a zoom-in/zoom-out image is generated directly from the round-shape input image formed on the light receiving section 4*c*.

Furthermore, a transformation region determination function is achieved such that the range of a transformation region in a radius direction of the round-shape input image formed on the light receiving section 4*c* is determined by a certain key operation during the transformation from the round-shape input image into a panoramic image. When the imaging section is in a transformation region determination mode, a transformation region can be determined by a certain key operation. In particular, a transformation region in the round-shape input image is defined by two circles, i.e., as shown in part (a) of FIG. 7, an inner circle including the reference point O(ro,θo) whose radius is ro and an outer circle which corresponds to an upper side of the panoramic image 21 shown in part (c) of FIG. 7. The maximum radius of the round-shape input image formed on the light receiving section 4*c* is rmax, and the minimum radius of an image of the light receiving section 4*c* is rmin. The radiuses of the above two circles which define the transformation region can be freely determined within the range from rmin to rmax by a certain key operation.

In the image comparison/distance determination section 5*b* shown in FIG. 6, the image comparison/distance determination logic 16 compares data stored in the first input buffer memory 11 and data stored in the second input buffer memory 17 so as to obtain angle data with respect to a target object, the velocity information which represents the speed of the vehicle 1, and a time difference between the data stored in the first input buffer memory 11 and the data stored in the second input buffer memory 17. From these obtained information, the image comparison/distance determination logic 16 calculates a distance between the vehicle 1 and the target object.

Figure 9:
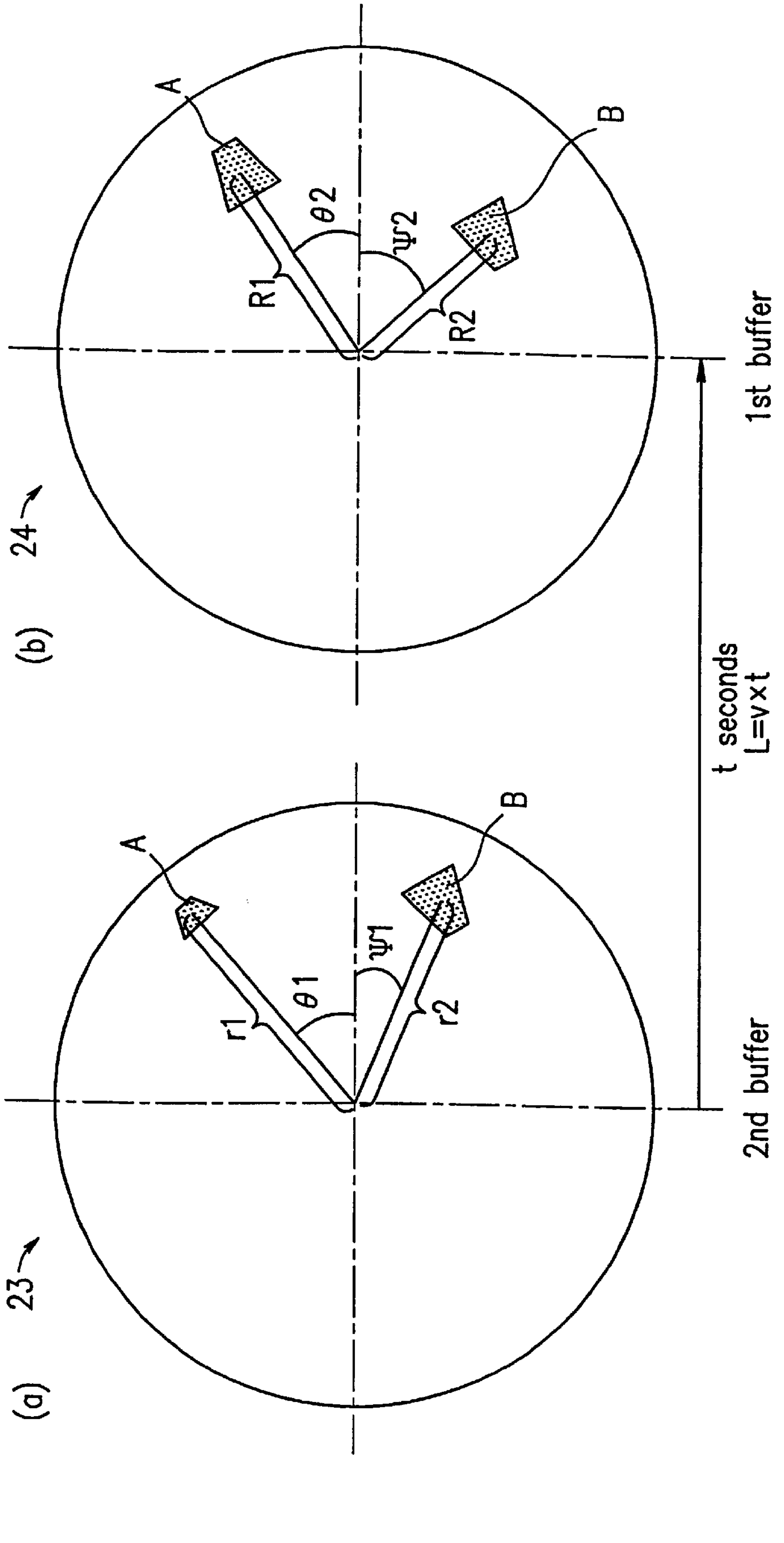
FIG. 9 is a schematic view for illustrating a principle of distance determination according to embodiment 1.

A principle of the distance determination between the vehicle 1 and the target object is now described with reference to FIG. 9. Part (a) of FIG. 9 shows an input image 23 obtained at time t0 and stored in the second input buffer memory 17. Part (b) of FIG. 9 shows an input image 24 obtained t seconds after time t0 and stored in the first input buffer memory 11. It is due to the delay circuit 18 (FIG. 6) that the time (time t0) of the input image 23 stored in the second input buffer memory 17 and the time (time t0+t) of the input image 24 stored in the first input buffer memory 11 are different.

Image information obtained by the imaging section 4*b* at time t0 is input to the first input buffer memory 11. The image information obtained at time t0 is transmitted through the delay circuit 18 and reaches the second input buffer memory 17 t seconds after the imaging section 4*b* is input to the first input buffer memory 11. At the time when the image information obtained at time t0 is input to the second input buffer memory 17, image information obtained t seconds after time t0 is input to the first input buffer memory 11. Therefore, by comparing the data stored in the first input buffer memory 11 and the data stored in the second input buffer memory 17, a comparison can be made between the input image obtained at time t0 and the input image obtained t seconds after time t0.

In Part (a) of FIG. 9, at time t0, an object A and an object B are at position (r1,θ1) and position (r2,ψ1) on the input image 23, respectively. In Part (b) of FIG. 9, t seconds after time t0, the object A and the object B are at position (R1,θ2) and position (R2,ψ2) on the input image 24, respectively.

A distance L that the vehicle 1 moved for t seconds is obtained as follows based on velocity information from a velocimeter of the vehicle 1:

$$L=v\times t$$

where v denotes the velocity. (In this example, velocity v is constant for t seconds.) Thus, with the above two types of image information, the image comparison/distance determination logic 16 can calculate a distance between the vehicle 1 and a target object based on the principle of triangulation. For example, t seconds after time t0, a distance La between the vehicle 1 and the object A and a distance Lb between the vehicle 1 and the object B are obtained as follows:

$$La=L\theta1/(\theta2"\theta1)$$

$$Lb=L\psi1/(\psi2-\psi1)$$

Calculation results for La and Lb are sent to the display section 6 (FIG. 2) and displayed thereon. Furthermore, when the object comes into a predetermined area around the vehicle 1, the image processor 5 (FIG. 2) outputs an alarming signal to the alarm generation section 8 (FIG. 2) including a speaker, etc., and the alarm generation section 8 gives forth a warning sound. Meanwhile, referring to FIG. 2, the alarming signal is also transmitted from the image processor 5 to the display control section 7, and the display control section 7 produces an alarming display on a screen of the display section 6 so that, for example, a screen display of a perspective image flickers. In FIGS. 2 and 4, an output 16*a* of the image comparison/distance determination logic 16 is an alarming signal to the alarm generation section 8, and an output 16*b* of the image comparison/distance determination logic 16 is an alarming signal to the display control section 7.

The display section 6 may be a monitor, or the like, of a cathode-ray tube, LCD, EL, etc. The display section 6 receives an output from the output buffer memory 5*c* of the image processor 5 and displays an image. Under the control of the display control section 7, the display section 6 can display a panoramic image and a perspective image at one time, or selectively display one of the panoramic image and the perspective image. Furthermore, in the case of displaying the perspective image, the display section 6 displays a frontal view field perspective image and left and right view field perspective images at one time. Additionally, a rear view field perspective image can be displayed when necessary. Further still, the display control section 7 may select one of these perspective images, and the selected perspective image may be vertically/horizontally moved or scaled-up/scaled-down before it is displayed on the display section 6.

Moreover, in response to a signal from a switching section 70 located on a front dashboard near the driver's seat, the display control section 7 switches a display on the screen of the display section 6 between a display of an image showing surroundings of the vehicle 1 and a display of a vehicle location image. For example, when the switching section directs the display control section 7 to display the vehicle location image, the display control section 7 displays vehicle location information obtained by the vehicle location detection section 9, such as a GPS or the like, on the display section 6. When the switching section directs the display control section 7 to display the image showing surroundings of the vehicle 1, the display control section 7 sends vehicle surround image information from the image processor 5 to the display section 6, and an image showing surroundings of the vehicle 1 is displayed on the display section 6 based on the vehicle surround image information.

The display control section 7 may be a special-purpose microcomputer or the like. The display control section 7 selects the type of an image to be displayed on the display section 6 (for example, a panoramic image, a perspective image, etc., obtained by the image transformation in the image processor 5), and controls the orientation and the size of the image.

Figure 10:
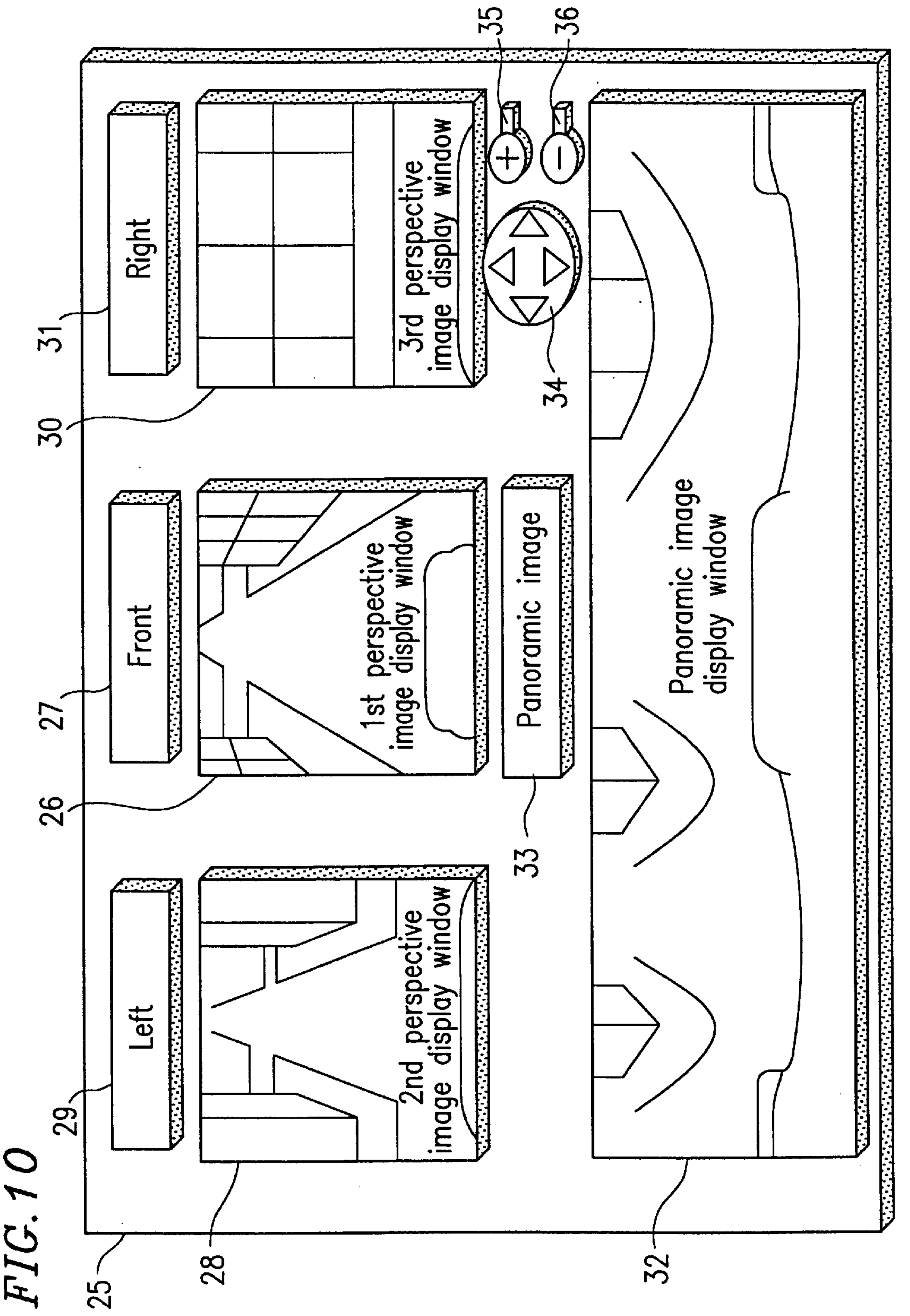
FIG. 10 shows an example of a display screen 25 of the display section 6.

FIG. 10 shows an example of a display screen 25 of the display section 6. The display screen 25 includes: a first perspective image display window 26 (in the default state, the first perspective image display window 26 displays a frontal view field perspective image); a first explanation display window 27 for showing an explanation of the first perspective image display window 26; a second perspective image display window 28 (in the default state, the second perspective image display window 28 displays a left view field perspective image); a second explanation display window 29 for showing an explanation of the second perspective image display window 28; a third perspective image display window 30 (in the default state, the third perspective image display window 30 displays a right view field perspective image): a third explanation display window 31 for showing an explanation of the third perspective image display window 30; a panoramic image display window 32 (in this example, a 360° image is shown); a fourth explanation display window 33 for showing an explanation of the panoramic image display window 32; a direction key 34 for vertically/horizontally scrolling images; a scale-up key 35 for scaling up images: and a scale-down key 36 for scaling down images.

The first through fourth explanation display windows 27, 29, 31, and 33 function as switches for activating the image display windows 26, 28, 30, and 32. A user (driver) activates a desired image display window (window 26, 28, 30, or 32) by means of a corresponding explanation display window (window 27, 29, 31, or 33) which functions as a switch, whereby the corresponding explanation display window changes its own display color, and the user can vertically/horizontally scroll and scale-up/down the image displayed in the activated window using the direction key 34, the scale-up key 35, and the scale-down key 36. It should be noted that an image displayed in the panoramic image display window 32 is not scaled-up or scaled-down.

For example, when the user (driver) touches the first explanation display window 27, a signal is output to the display control section 7 (FIG. 2). In response to the touch, the display control section 7 changes the display color of the first explanation display window 27 into a color which indicates the first perspective image display window 26 is active, or allows the first explanation display window 27 to flicker. Meanwhile, the first perspective image display window 26 becomes active, and the user can vertically/horizontally scroll and scale-up/down the image displayed in the window 26 using the direction key 34, the scale-up key 35, and the scale-down key 36. In particular, signals are sent from the direction key 34, the scale-up key 35, and the scale-down key 36 through the display control section 7 to the image transformation section **5*a* of the image processor 5 (FIG. 2). According to the signals from the direction key 34, the scale-up key 35, and the scale-down key 36, an image is transformed, and the transformed image is transmitted to the display section 6 (FIG. 2) and displayed on the screen 25 of the display section 6**.

(Embodiment 2)

Figure 11A:
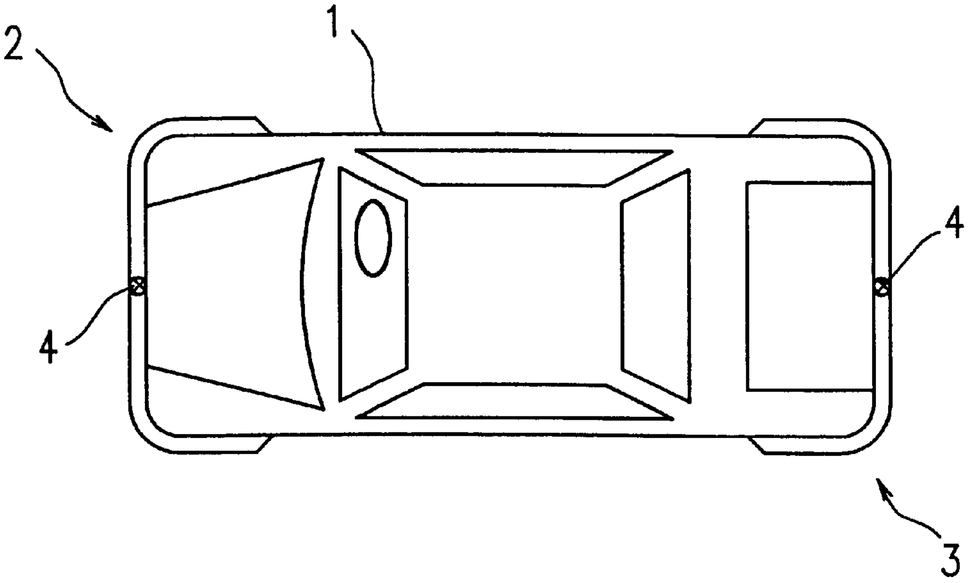
FIG. 11A is a plan view showing a vehicle including a surround surveillance system for a mobile body according to embodiment 2 of the present invention.
Figure 11B:
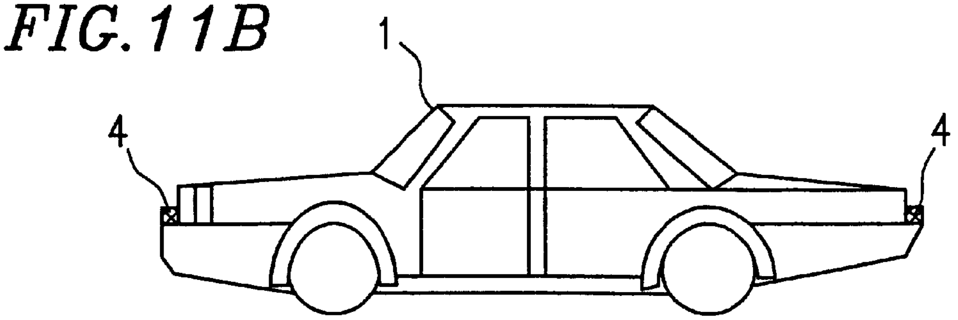
FIG. 11B is a side view of the vehicle.

FIG. 11A is a plan view showing a vehicle 1 which includes a surround surveillance system for a mobile body according to embodiment 2 of the present invention. FIG. 11B is a side view of the vehicle 1.

In embodiment 2, the vehicle 1 has a front bumper 2, a rear bumper 3, and omniazimuth visual sensors 4. One of the omniazimuth visual sensors 4 is placed on the central portion of the front bumper 2, and the other is placed on the central portion of the rear bumper 3. Each of the omniazimuth visual sensor 4 has a 360° view field around itself in a generally horizontal direction.

However, a half of the view field (rear view field) of the omniazimuth visual sensor 4 on the front bumper 2 is blocked by the vehicle 1. That is, the view field of the omniazimuth visual sensor 4 is limited to the 180° frontal view field (from the left side to the right side of the vehicle 1). Similarly, a half of the view field (frontal view field) of the omniazimuth visual sensor 4 on the rear bumper 3 is blocked by the vehicle 1. That is, the view field of the omniazimuth visual sensor 4 is limited to the 180° rear view field (from the left side to the right side of the vehicle 1). Thus, with these two omniazimuth visual sensors 4, a view field of about 360° in total can be obtained.

According to embodiment 1, as shown in FIGS. 1A and 1B, the omniazimuth-visual sensor 4 is located on a roof of the vehicle 1. From such a location, one omniazimuth visual sensor 4 can obtain an image of 360° view field area around itself in a generally horizontal direction. However, as seen from FIGS. 1A and 1B, the omniazimuth visual sensor 4 placed in such a location cannot see blind areas blocked by the roof; i.e., the omniazimuth visual sensor 4 located on the roof of the vehicle 1 (embodiment 1) cannot see blind areas as close proximity to the vehicle 1 as the omniazimuth visual sensor 4 placed at the front and rear of the vehicle 1 (embodiment 2). Moreover, in a crossroad area where there are driver's blind areas behind obstacles at left-hand and right-hand sides of the vehicle 1, the vehicle 1 should advance into the crossroad so that the omniazimuth visual sensor 4 can see the blind areas. On the other hand, according to embodiment 2, since the omniazimuth visual sensors 4 are respectively placed at the front and rear of the vehicle 1, one of the omniazimuth visual sensors 4 can see the blind areas before the vehicle 1 deeply advances into the crossroad to such an extent that the vehicle 1 according to embodiment 1 does. Furthermore, since the view fields of the omniazimuth visual sensors 4 are not blocked by the roof of the vehicle 1, the omniazimuth visual sensors 4 can see areas in close proximity to the vehicle 1 at the front and rear sides.

(Embodiment 3)

Figure 12A:
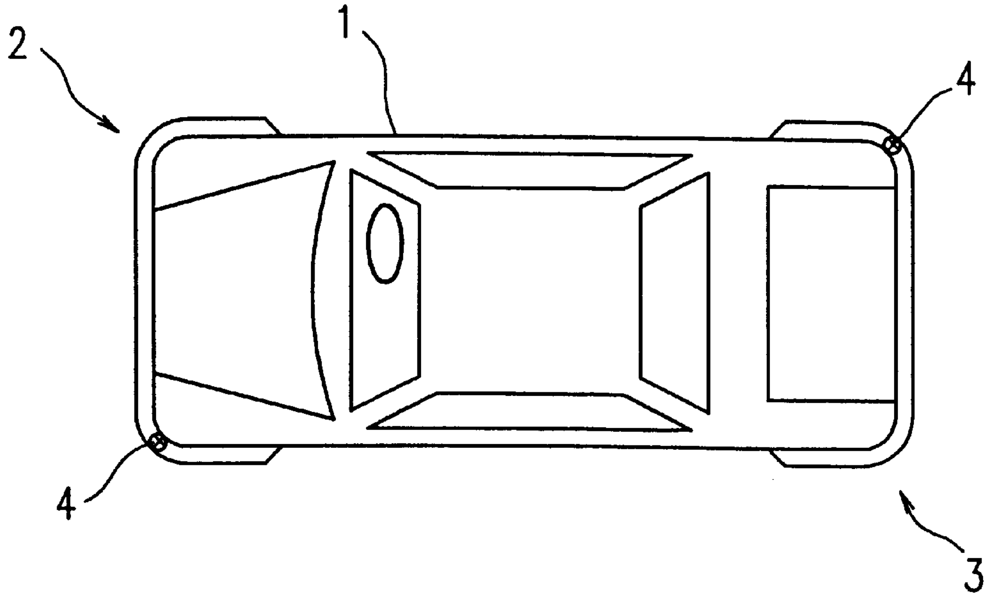
FIG. 12A is a plan view showing a vehicle including a surround surveillance system for a mobile body according to embodiment 3 of the present invention.
Figure 12B:
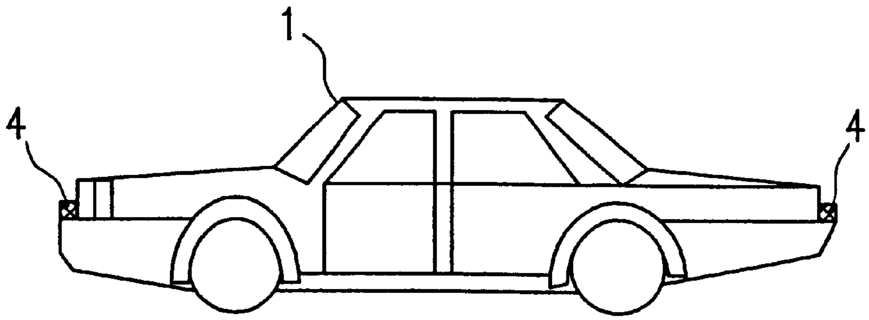
FIG. 12B is a side view of the vehicle.

FIG. 12A is a plan view showing a vehicle 1 which includes a surround surveillance system for a mobile body according to embodiment 3 of the present invention. FIG. 12B is a side view of the vehicle 1.

According to embodiment 3, one of the omniazimuth visual sensors 4 is placed on the left corner of the front bumper 2, and the other is placed on the right corner of the rear bumper 3. Each of the omniazimuth visual sensors 4 has a 360° view field around itself in a generally horizontal direction.

However, one fourth of the view field (a right-hand half of the rear view field (about 90°)) of the omniazimuth visual sensor 4 on the front bumper 2 is blocked by the vehicle 1. That is, the view field of the omniazimuth visual sensor 4 is limited to about 270° front view field. Similarly, one fourth of the view field (a left-hand half of the front view field (about 90°)) of the omniazimuth visual sensor 4 on the rear bumper 3 is blocked by the vehicle 1. That is, the view field of the omniazimuth visual sensor 4 is limited to about 270° rear view field. Thus, with these two omniazimuth visual sensors 4, a view field of about 360° can be obtained such that the omniazimuth visual sensors 4 can see areas in close proximity to the vehicle 1 which are the blind areas of the vehicle 1 according to embodiment 1.

Also in embodiment 3, in a crossroad area where there are driver's blind areas behind obstacles at left-hand and right-hand sides of the vehicle 1, the vehicle 1 does not need to deeply advance into the crossroad so as to see the blind areas at right and left sides. Furthermore, since the view fields of the omniazimuth visual sensors 4 are not blocked by the roof of the vehicle 1 as in embodiment 1, the omniazimuth visual sensors 4 can see areas in close proximity to the vehicle 1 at the front, rear, left, and right sides thereof.

In embodiments 1–3, the vehicle 1 shown in the drawings is an automobile for passengers. However, the present invention also can be applied to a large vehicle, such as a bus or the like, and a vehicle for cargoes. In particular, the present invention is useful for cargo vehicle because in many cargo vehicles a driver's view in the rearward direction of the vehicle is blocked by a cargo compartment. The application of the present invention is not limited to motor vehicles (including automobiles, large motor vehicles, such as buses, trucks, etc., and motor vehicles for cargoes). The present invention is applicable to trains.

(Embodiment 4)

Figure 13A:
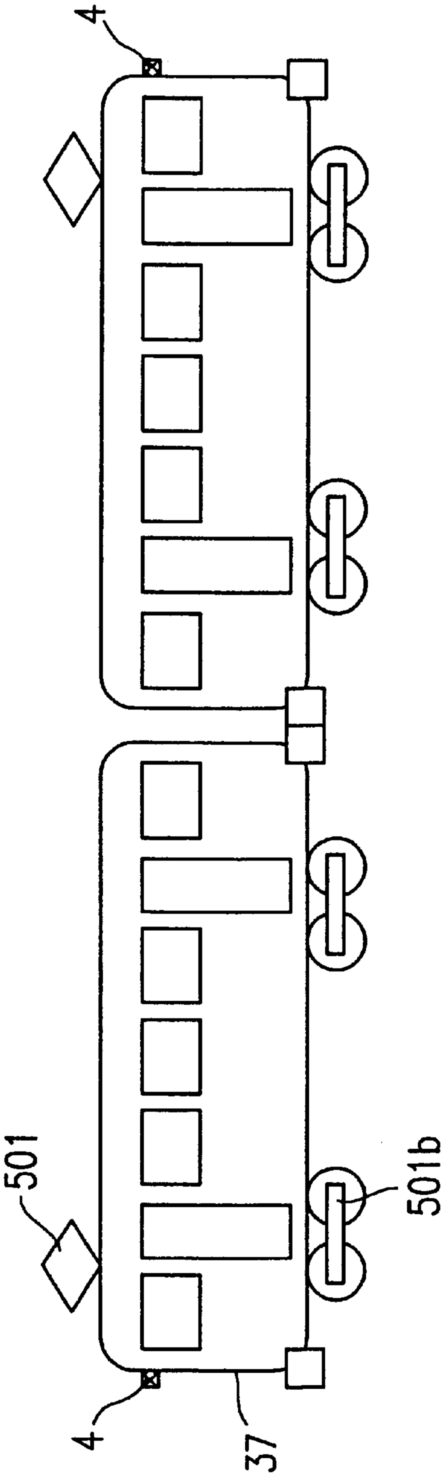
FIG. 13A is a side view showing a train which includes a surround surveillance system for a mobile body according to embodiment 4 of the present invention.
Figure 13B:
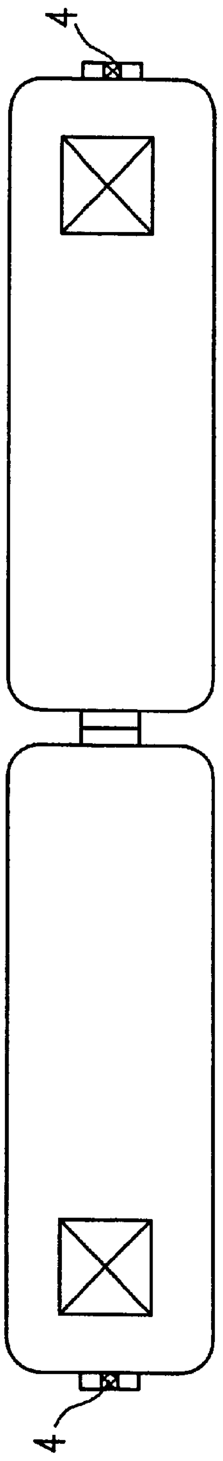
FIG. 13B is a plan view of the train 37 shown in FIG. 13A.

FIG. 13A is a side view showing a train 37 which includes a surround surveillance system for a mobile body according to embodiment 4 of the present invention. FIG. 13B is a plan view of the train 37 shown in FIG. 13A. In embodiment 4, the train 37 is a railroad train.

In embodiment 4, as shown in FIGS. 13A and 13B, the omniazimuth visual sensors 4 of the surround surveillance system are each provided on the face of a car of the train 37 above a connection bridge. These omniazimuth visual sensors 4 have 180° view fields in the running direction and in the direction opposite thereto, respectively.

In embodiments 1–4, the present invention is applied to a vehicle or a train. However, the present invention can be applied to all types of mobile bodies, such as aeroplanes, ships, etc., regardless of whether such mobile bodies are manned/unmanned.

Furthermore, the present invention is not limited to a body moving one place to another. When a surround surveillance system according to the present invention is mounted on a body which moves in the same place, the safety around the body when it is moving can readily be secured.

In embodiments 1–4, an optical system shown in FIG. 3 is used as the optical system 4*a* which is capable of obtaining an image of 360° view field area therearound and capable of central projection transformation for the image. The present invention is not limited to such an optical system, but can use an optical system described in Japanese Laid-Open Publication No. 11-331654.

As described hereinabove, according to the present invention, an omniazimuth visual sensor(s) is placed on an upper side, an end portion, etc., of a vehicle, whereby a driver's blind areas can be readily observed. With such a system, the driver does not need to switch a plurality of cameras, to select one among these cameras for display on a display device, or to change the orientation of the camera, as in a conventional vehicle surveillance apparatus. Thus, when the driver starts to drive, when the motor vehicle turns right or left, or when the driver parks the motor vehicle in a carport or drives the vehicle out of the carport, the driver can check the safety around the vehicle and achieve safe driving.

Furthermore, the driver can select a desired display image and change the display direction or the image size. Thus, for example, by switching a display when the vehicle moves rearward, the safety around the vehicle can be readily checked, whereby a contact accident(s) or the like can be prevented.

Furthermore, it is possible to switch between a display of an image of the surroundings of the mobile body and a display of vehicle location. Thus, the space around the driver's seat is not narrowed, and manipulation of the system is not complicated as in the conventional system.

Further still, a distance from an object around the mobile body, the relative velocity, a moving direction of the mobile body, etc., are determined. When the object comes into a predetermined area around the mobile body, the system can produce an alarm. Thus, the safety check can be readily performed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A surround surveillance system mounted on a mobile body for surveying surroundings around the mobile body, comprising an omniazimuth visual system, the omniazimuth visual system including:

at least one omniazimuth visual sensor including an optical system capable of obtaining an image of 360° view field area therearound and capable of central projection transformation for the image, and an imaging section for converting the image obtained by the optical system into first image data;

an image processor for transforming the first image data into second image data for a panoramic image and/or for a perspective image;

a display section for displaying the panoramic image and/or the perspective image based on the second image data; and a display control section for selecting and controlling the panoramic image and/or the perspective image.

2. A surround surveillance system according to claim 1, wherein the display section displays the panoramic image and the perspective image at one time, or the display section selectively displays one of the panoramic image and the perspective image.

3. A surround surveillance system according to claim 1, wherein the display section simultaneously displays at least frontal, left, and right view field perspective images within the 360° view field area based on the second image data.

4. A surround surveillance system according to claim 3, wherein:

the display control section selects one of the frontal, left, and right view field perspective images displayed by the display section;

the image processor vertically/horizontally moves or scales-up/scales-down the view field perspective image selected by the display control section according to an external operation; and the display section displays the moved or scaled-up/scaled-down image.

5. A surround surveillance system according to claim 1, wherein:

the display section includes a location display section for displaying a mobile body location image; and the display control section switches the display section between an image showing surroundings of the mobile body and the mobile body location image.

6. A surround surveillance system according to claim 1, wherein the mobile body is a motor vehicle.

7. A surround surveillance system according to claim 6, wherein the at least one omniazimuth visual sensor is placed on a roof of the motor vehicle.

8. A surround surveillance system according to claim 6, wherein:

the at least one omniazimuth visual sensor includes first and second omniazimuth visual sensors;

the first omniazimuth visual sensor is placed on a front bumper of the motor vehicle; and the second omniazimuth visual sensor is placed on a rear bumper of the motor vehicle.

9. A surround surveillance system according to claim 8, wherein:

the first omniazimuth visual sensor is placed on a left or right corner of the front bumper; and the second omniazimuth visual sensor is placed at a diagonal position on the rear bumper with respect to the first omniazimuth visual sensor.

10. A surround surveillance system according to claim 1, wherein the mobile body is a train.

11. A surround surveillance system according to claim 1, further comprising:

means for determining a distance between the mobile body and an object around the mobile body, a relative velocity of the object with respect to the mobile body, and a moving direction of the object based on a signal of the image data from the at least one omniazimuth visual sensor and a velocity signal from the mobile body; and alarming means for producing alarming information when the object comes into a predetermined area around the mobile body.

12. A surround surveillance system, comprising:

an omniazimuth visual sensor including an optical system capable of obtaining an image of 360° view field area therearound and capable of central projection transformation for the image, and an imaging section for converting the image obtained by the optical system into first image data;

an image processor for transforming the first image data into second image data for a panoramic image and/or for a perspective image;

a display section for displaying the panoramic image and/or the perspective image based on the second image data; and a display control section for selecting and controlling the panoramic image and/or the perspective image.

13. A mobile body, comprising the surround surveillance system of claim 12.

14. A motor vehicle, comprising the surround surveillance system of claim 12.

15. A train, comprising the surround surveillance system of claim 12.

* * * * *